Dec. 10, 1963  B. B. ELDER  3,113,739
CABLE WINDING DEVICE
Filed Jan. 2, 1962  7 Sheets-Sheet 2

INVENTOR:
Boyd B. Elder

By Smyth, Roston & Pavitt
Attorneys

Dec. 10, 1963  B. B. ELDER  3,113,739
CABLE WINDING DEVICE

Filed Jan. 2, 1962  7 Sheets-Sheet 3

INVENTOR:
Boyd B. Elder

Attorneys

Dec. 10, 1963

B. B. ELDER 3,113,739

CABLE WINDING DEVICE

Filed Jan. 2, 1962

INVENTOR:
Boyd B. Elder

By Smyth, Roston & Pavitt

Attorneys

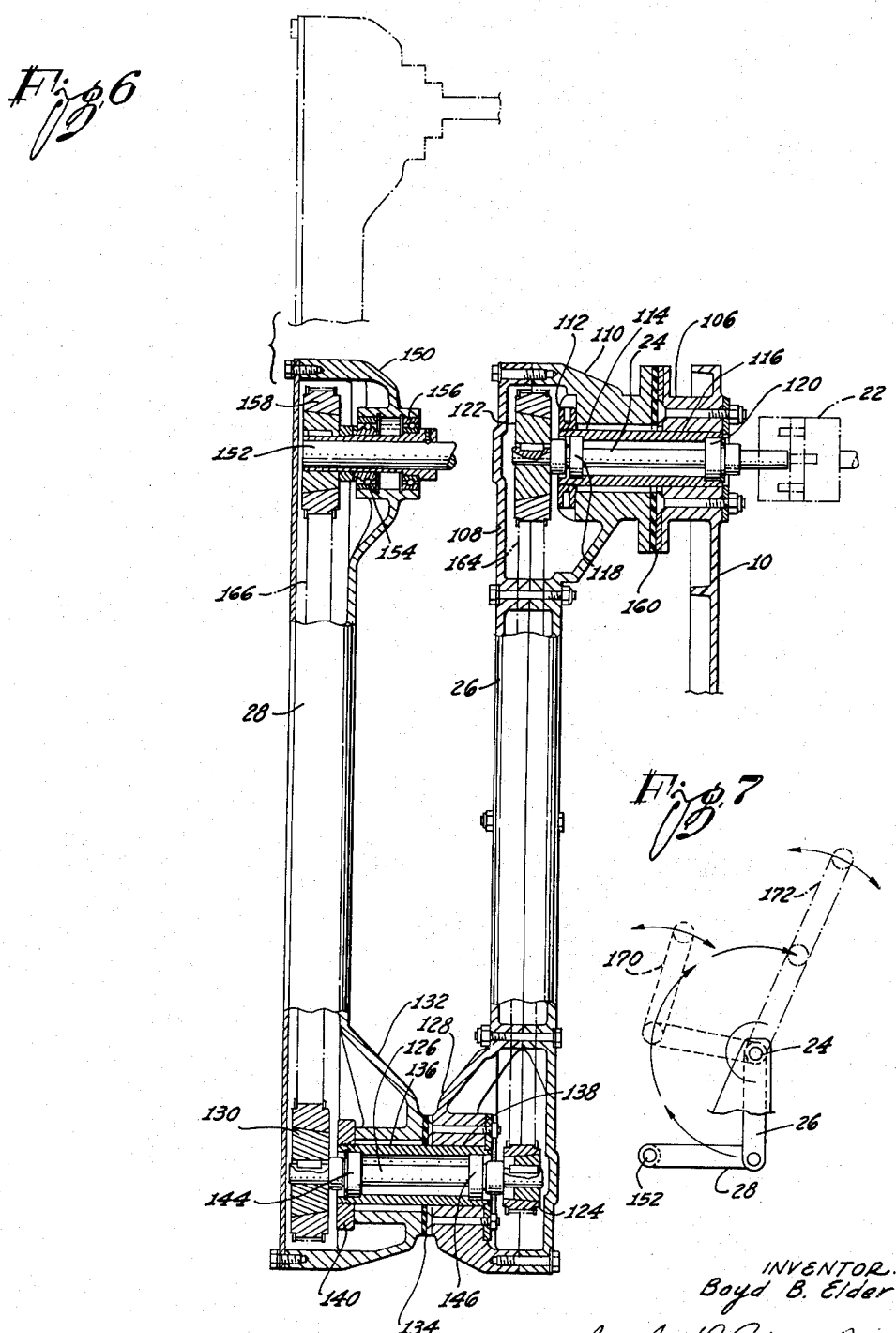

Dec. 10, 1963　　　　B. B. ELDER　　　　3,113,739
CABLE WINDING DEVICE

Filed Jan. 2, 1962　　　　　　　　　　　　7 Sheets-Sheet 7

INVENTOR:
Boyd B. Elder

By Smyth, Roston & Pavitt
　　　　　Attorneys

United States Patent Office 3,113,739
Patented Dec. 10, 1963

3,113,739
CABLE WINDING DEVICE
Boyd B. Elder, Palos Verdes Estates, Calif., assignor to Del Mar Engineering Laboratories, Los Angeles, Calif., a corporation of California
Filed Jan. 2, 1962, Ser. No. 163,405
5 Claims. (Cl. 242—54)

The invention relates to line or cable winding and unwinding equipment, and particularly to such equipment adapted to offer in-site installation and removal of tow target line on aircraft and the like.

A major field of utility of the present invention is in the efficient installation and removal of tow target wire useable with appropriate tow target reels usually carried by or installable in aircraft. Those familiar with the modern air target tow operations are aware of the fact that safety requirements demand that the target being towed be spaced from the towing aircraft a relatively great distance. Frequently, the target is carried many thousands of feet behind the aircraft. This spacial requirement is dictated by the speed and fire power of modern aircraft and by giving appropriate consideration to the safety of towing aircraft personnel. This requirement for an extremely long lead wire or the like has heretofore resulted in considerable expenditure of time merely to install wire on an appropriate aircraft tow reel. Some procedures heretofore employed required that the tow reel be removed from the aircraft for "in shop" line assembly and this operation obviously has been time consuming and inefficient. This inefficiency is, of course, multiplied where it becomes necessary, for example, to remove one tow line from a given craft and subsequently install a different line where a different tow operation is contemplated.

Additionally, the wire must be carefully wound to avoid snags which could render the tow reel inoperative. Accurate wire installation also avoids localized overstressing of any portion of the line which could lead to line fracture with attendant interruption of the tow operation as well as possible danger or injury to operating personnel and equipment.

The present invention comprehends a unique line or cable winding and unwinding device, particularly adapted to the assembly and the removal of tow target line from appropriate reels and the like. An important feature which characterizes the disclosed equipment is that it is readily portable and has design features that render it adaptable for use with tow reels actually installed in aircraft as well as being employable for example, in "in shop" installations. This flexibility of application substantially reduces wire installation time and importantly improves the efficiency of the entire operation.

Other features of the disclosed invention incorporate a novel, jointed power transmission arrangement adapted to be readily and selectably associated with different operating devices without impairing the power transmission ability. Further, the disclosed invention incorporates a storage reel braking feature which provides for more proper reel motion to insure accurate wire winding under all conditions of operation. Additionally, the arrangement discloses a unique mode of maintaining proper line tension during wire installation on aircraft tow reels and thereby avoids wire snag or the like which could and has led to wire fracture and reel inoperativeness.

These and other advantages and features of the disclosed invention will become apparent in the course of the following description and upon an examination of the disclosed drawings, wherein:

FIGURE 6 is a fragmentary elevational view illustrating the power transmission arm;

FIGURE 7 is a fragmentary schematic view illustrating the mode of varying the position of the transmission arm of FIGURE 6;

Figure 1:
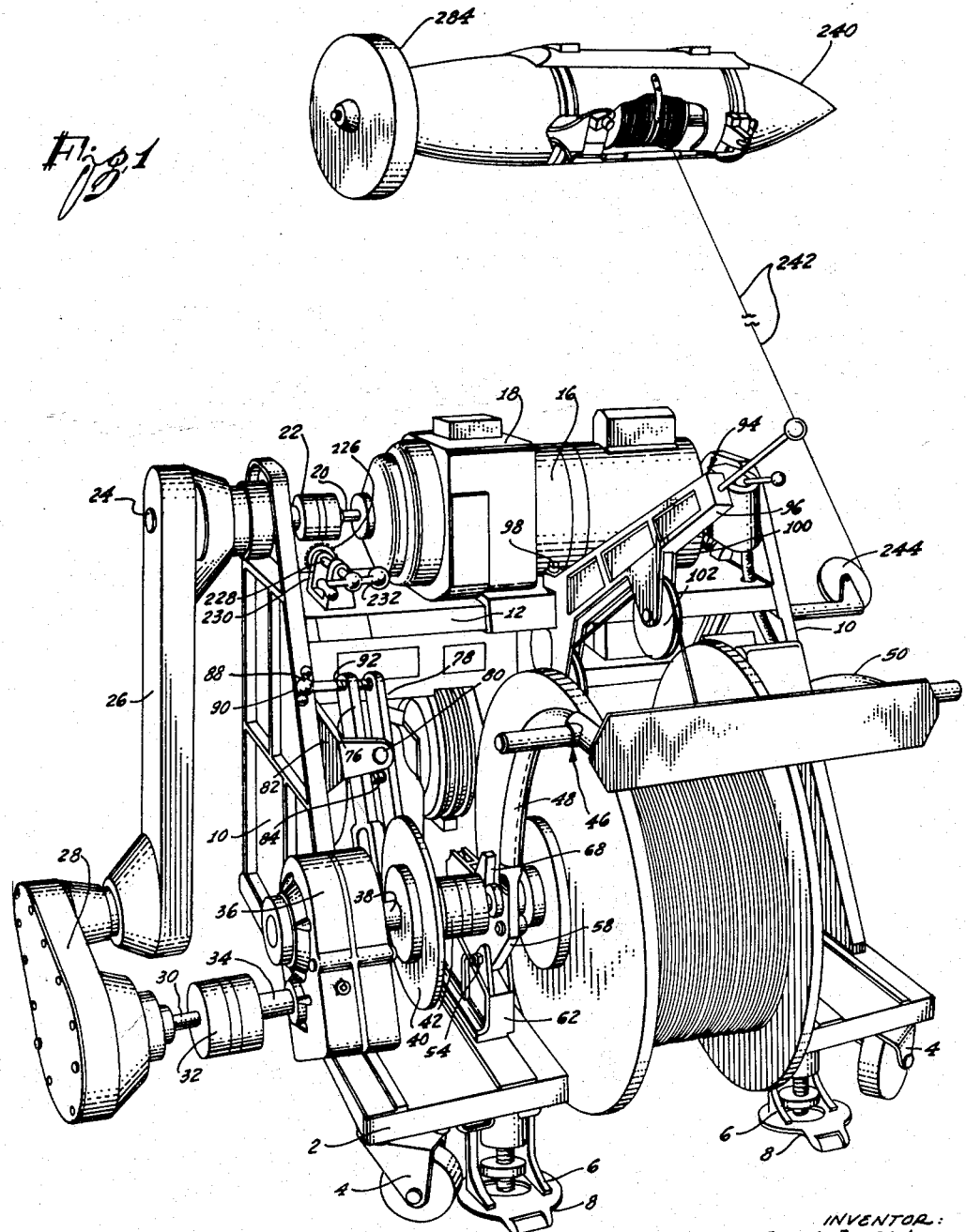
FIGURE 1 is an elevational perspective view of the herein disclosed equipment showing same in operative position to remove the tow wire or cable from the tow target reel.
Figure 2:
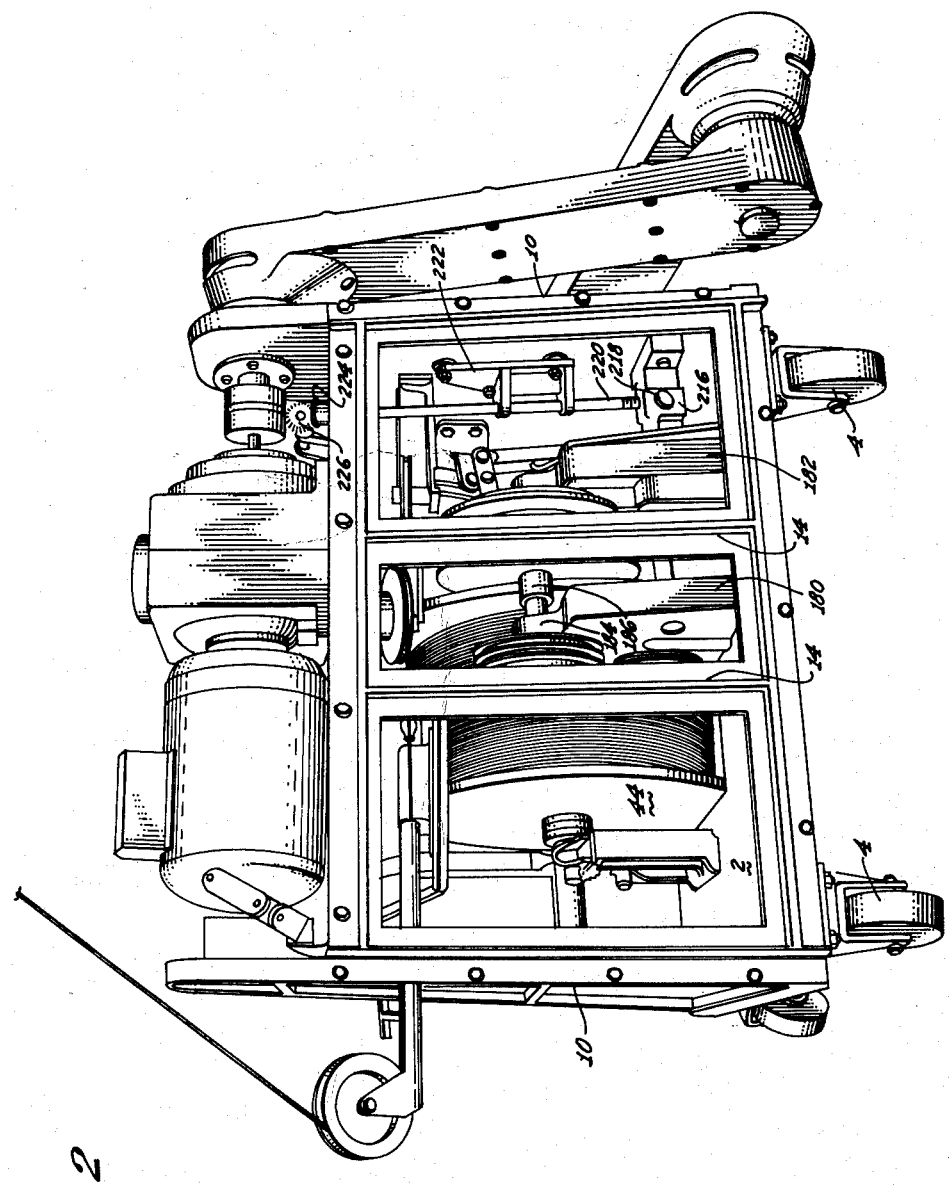
FIGURE 2 is a perspective rear elevational view of the structure shown in FIGURE 1.
Figure 3:
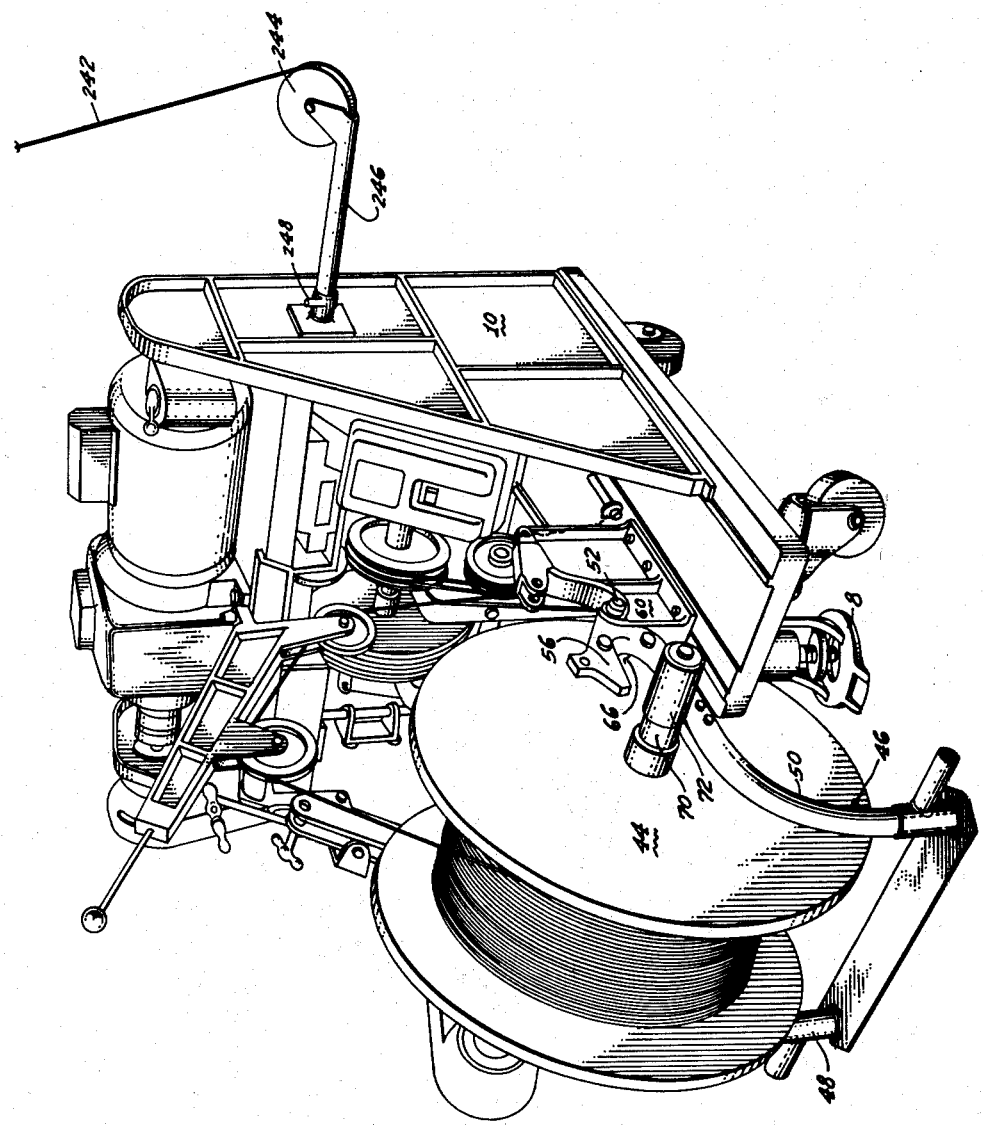
FIGURE 3 is a perspective elevational view taken from the right of the structure shown in FIGURE 1.

Describing the invention in detail and directing attention initially to FIGURES 1, 2 and 3, it will be understood that the equipment here disclosed comprises initially a base 2, said base 2 having mounted on the lower side thereof a plurality of casters 4, 4, the latter being provided to offer mobility to the unit. A pair of manually depressible floor clamps 6 are mounted on the front of the machine as seen in FIGURE 1, and may be of any conventional design whereby, upon actuation thereof, the gripping plates 8 may be moved downwardly to frictionally engage the adjacent supporting surface and thereby effectively lock the equipment into a desired position relative to such supporting surface. Projecting upwardly on both sides of the base plate 2 are side frame plates 10, 10. Approximately two-thirds the maximum upwardly extent of the side plates 10, adjoining supporting plate 12 is positioned rigidly interconnecting the side plates 10 to each other. It will be understood that the various structural members herein referred to may be secured to each other in any conventional manner as, for example, by bolting, welding or the like. Brace elements 14, 14 may be positioned to fixedly interconnect the upper plate 12 to the base plate 2 as seen in FIGURE 2.

Power for the unit is provided by an electric motor 16 having associated therewith a conventional variable speed transmission 18, both of which are fixedly mounted on the upper plate 12. The transmission 18 has a first shaft 20 projecting therefrom, the latter being fixedly associated with one side of a power transmitting coupling 22. The coupling 22 is connected on its opposed end with a drive shaft 24, the latter extending through the related side frame 10 and approximately journalled therein for rotative movement, as will hereinafter be explained. Power is transmitted from the coupling 22 through variable arm housings 26 and 28 to a second drive shaft 30. The operating structure of the arm housings 26 and 28 will hereinafter be explained in detail. The output shaft 30 is fixedly connected to one side of a breakable coupling 32, the latter having its other side connected to the input shaft 34 of a conventional speed reducer 36. The speed reducer 36 is fixedly mounted to the base 2 adjacent one side frame 10 and is provided with an output shaft 38, the latter having fixedly mounted thereon a cylindrical brake disc 40. Demountable coupling 42 is fixedly connected to the shaft 38 and immediately adjacent the brake disc 42.

Attention is now directed to FIGURE 3 which illustrates a storage reel 44 in pre-assembled position immediately prior to association with the equipment and before operation thereof. For clarity the tow cable is shown in strung relation to the device. To facilitate mounting of the storage reel 44, the equipment is provided with a cradle indicated generally at 46, said cradle 46 comprising a pair of spaced arms 48 and 50 which extend inwardly toward the machine for journalled connection thereto as at 52 and 54. The journalled mounting just indicated is provided by pinned reception of the end plates 56 and 58 within the bifurcated brackets 60 and 62, the latter being fixedly secured to the base 2. The end plates 56 and 58 are provided with open-ended receiving slots 66 and 68 which rollably receive opposed end portions of the reel-connected spindle 70. As seen in FIGURE 3, the spindle 70 is provided with a bearing 72 which accommodates spindle rotation and consequent rotation of the reel 44.

Thus, in order to assemble the reel 44 to the equipment, it is merely necessary to position the cradle 46 as shown in FIGURE 3, bring the reel 44 into alignment intermediate the arms 48 and 50, and rollably move the reel into position in the slots 66 and 68. Thereafter, the cradle 46 is pivoted upwardly to the position shown in FIGURE 1 whereat the spindle 70 is now in operative alignment with the shaft 38 and is connectable via coupling 42 to the shaft 38 whereby driving rotative motion may be imparted thereto as will hereafter be explained.

Another important aspect of the storage reel drive relates to the spaced brake arms 76 and 78 which are pivotally mounted to one side wall 10 as at 80 via the bracket 82. Arms 76 and 78 extend downwardly below their point of pivotal mounting and embrace the brake disc 40 as best seen in FIGURE 1. The arms 76 and 78 may, if desired, be provided with braking material such as brake shoes (not shown) in their areas of embrace with the disc 40. Alternately, the arms 76 and 78 may be of metallic construction whereas the disc 40 may be composed of appropriate friction material, thereby providing the braking effect contemplated and desired in equipment of this nature. A coiled spring 84 is interposed between the arms 76 and 78 below their point of pivot 80 and normally biases the related arm ends away from each other and out of engagement with the brake disc 40. At the opposed side of the pivot 80, a manually adjustable brake-applying device 88 is provided, said device comprising a handle 90 and a threaded rod 92 threadably received within the arm 76 and abuttingly engaging the arm 78. With the structure thus provided, it will be understood that upon appropriate rotation of the handle 90, the related ends of the arms 76 and 78 will be caused to spread apart, thus bringing the opposite ends thereof into appropriate clasping engagement with the brake disc 40. Reverse rotation of handle 90 coupled with action of spring 84 acts to release the clasp brake effect.

A manually operable level cable wind device is provided and is indicated generally at 94. The device 94 comprises a generally upwardly extending arm 96 having its inner end pivotally connected to the plate 12 as at 98. By virtue of the pivotal connection 98, the arm 96 is arcuately movable in a plane above the reel 44 and in approximate normal relationship with the tangential line of wire feed thereto. To accomplish the desired cable feed, the arm 96 is provided with a bifurcated, downwardly extending bracket 100 having a pulley 102 journally carried therebetween, said pulley being in arcuate engagement with the appropriate wire or cable, as hereinafter described. It will thus be understood that upon rewinding of the cable on the reel 44, the arm 96 may be manually reciprocated by the operator above the winding surface of the reel 48, thus accommodating smooth and even disposition of wire or cable thereon.

Attention is now directed to FIGURE 6 which illustrates the shaft 24 and its connection with coupling 22 whereby power is transmitted to said shaft from the variable speed transmission 18. A first bearing hub 106 is fixedly secured to the upper end of the side wall 10. The first variable arm housing 26 comprises the casing 108 having a rightwardly extending hub 110 at one end thereof. The hub 110 receives locking collar 112, the latter being threadably fixed to one end of a supporting tube 114. The tube 114 extends outwardly through the hub 110 whereat it is journally received within the boss 106 as at 116. The tube 114 is hollow and accommodates the extension therethrough of shaft 24, the latter being journally mounted via bearings 118 and 120 within the tube 114. A sheave or gear 122 is mounted within the casing 108 at the outer extremity of shaft 24 and is fixedly secured thereto for rotation with said shaft. The casing 108 extends downwardly, as seen in FIGURE 6, to a point where it encloses a sheave or gear 124, the latter being fixedly mounted on transmission shaft 126. The shaft 126 extends outwardly through a boss 128 of the housing arm 26 and projects internally of the housing arm 28 whereat it fixedly carries sheave or gear 130. The housing arm 28 is also provided with boss 132 which extends outwardly adjacent boss 128 to engage same in an area of planar engagement as at 134. A tube 136 is journally received in the boss 128 as at 138 and extends outwardly for fixed threadable connection to the boss 132 as at 140. The tube 136 is hollow and thereby accommodates the mentioned extension of shaft 126 and further journally receives the shaft 136 therein by virtue of the bearings 144 and 146. Turning to the upper end of the housing arm 28, it will be noted that a boss 150 is provided, said boss 150 journally housing shaft 152 via bearings 154 and 156. The shaft 152 has one end extending into the housing arm 28 to fixedly carry gear or sheave 158 therein.

It will be understood that the boss 106 and the boss 110 are in face-to-face movable bearing engagement as at 160 while, as mentioned, the bosses 132 and 128 are in face-to-face bearing engagement as at 134. As a result of the structure described, the housing arms 26 and 28 may be rotated relative to each other and relative to the frame of the equipment.

Additionally, a conventional belt or chain drive 164 interconnects sheave 122 with sheave 124 while a conventional belt or chain drive 166 operatively interconnects sheave 130 and sheave 158. Thus, it will be understood that power from the output shaft 20 of the variable speed transmission 18 is transmitted via coupling 22 to the first sheave 122 and thence to sheave 124 via belt or chain 164, and thence to the output shaft 152 via shaft 126, sheave 130, belt or chain 166, and sheave 158. Further, relative rotation between the housing arms 28, 26, and the frame of the machine is accommodated, without impairing the power transmission features mentioned by virtue of the face bearing engagement at 160 and 134. Thus the arrangement is susceptible of the varying power connections hereinafter more fully described. To illustrate, attention is directed to FIGURE 7 which schematically shows the input shaft 24 and its central location on machine frame and the output shaft 152 as well as the housing arms 26 and 28. It will be noted, and as illustrated in FIGURE 7, the arms may be rotated to virtually any position as, for example, to the positions shown in phantom at 170 or 172.

Figure 8:
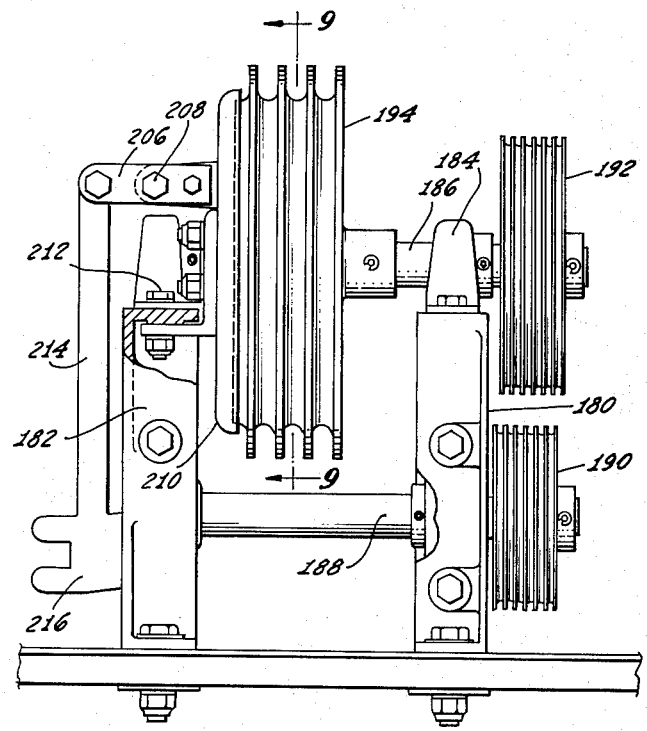
FIGURE 8 is a fragmentary elevational view of a device for maintaining appropriate wire or cable tension.

Returning to FIGURE 2, it will be understood that a supporting plate 180 is fixedly secured to the base 2 and projects thereabove to cooperate with a like supporting plate 182, also secured to the base 2, to accommodate mounting as at 184 and support for a shaft 186 and related equipment. The mounting 184 is preferably of the journal pillow block type, thus accommodating rotation of shaft 186. For purposes of clarity, FIGURES 8 and 9 should also be considered. A second shaft 188 is likewise carried by the plates 182 and 180 and extends through the latter to rotatably mount on the end thereof a capstan idler wheel 190. Shaft 186, on the other hand, also extends outboardly of supporting plate 180 and fixedly carries capstan wheel 192 on its outer end for rotation therewith. A cylindrical brake drum housing 194 is carried on the opposed end of shaft 186 for operative rotation therewith. The housing 194 is generally hollow as seen at 196 and encloses therein opposed brake shoes 198, 198. The shoes 198 are pivotally connected as at 200 and are further connected by spring 202 to normally bias same toward each other. A conventional shoe actuating cylinder 204 interconnects upper ends of the shoes 198, the latter being operatively associated with actuating arm 206 which, in turn, is pivotally mounted as at 208 to shoe supporting plate 210, the latter being fixedly carried from the plate 182 as at 212. The actuating arm 206 is connected to link 214 which extends downwardly whereat it mounted bifurcated end portion 216 as best seen in FIGURE 8 and FIGURE 2.

The bifurcated end portion 216 receives therebetween motion transmitting bar 218, the latter being threadably connected to the lower end of transmitting rod 220. The transmitting rod 220 is journally received in bracket 222, the latter being connected to the side wall 10 while the rod 220 extends upwardly through the plate 12 to mount beveled gear 224 on its upper end. The bevel gear 224 is in gear engagement with a second bevel gear 226, the latter, as best seen in FIGURE 1, being fixedly mounted on one end of an adjusting rod 228 which, in turn, is bracket mounted for journalled rotation relative to the plate 12 as at 230. Manually operable handle 232 is connected to the outer end of adjusting rod 228. It will thus be understood that, upon rotation of the handle 232, power is transmitted through the bevel gears 226 and 224 to induce a rotative motion of rod 220. Rod 220, being threadably received in the bar 218 will, upon rotative movement, vertically vary the position of the bar 218, thereby vertically varying the position of connected link 214. Vertical motion of the link 214 induces pivotal action of the arm 206 which, in turn, operatively induces actuation of the cylinder 204 which biases the brake shoes 198, accordingly, into frictional engagement with the drum or, reversably, accommodate contraction of the shoes 198 out of frictional engagement with the drum.

Figure 4:
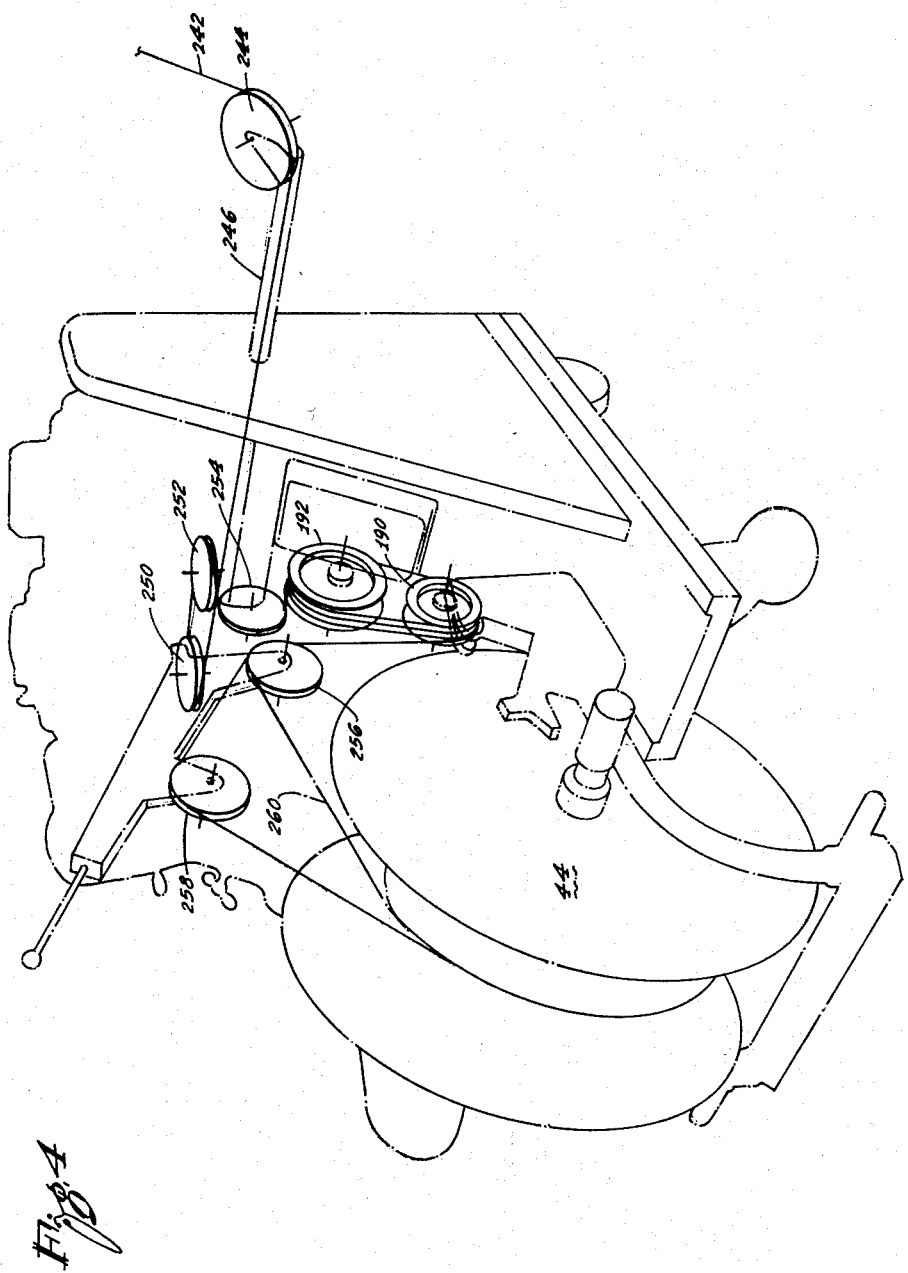
FIGURE 4 is a perspective partially phantom view illustrating the mode of line stringing throughout the equipment.

Attention is now directed to FIGURE 4 which illustrates the mode of wire or cable stringing utilized in accomplishing the functions of the herein disclosed equipment. Initially, it will be assumed that it is desired to wind appropriate target line from a tow reel to a storage reel 44 for appropriate disposition thereof. With this in mind, it will be understood that the arms 26 and 28 are connected as shown in FIGURE 1. The wire from the tow reel 240 is initially strung as at 242 through a guide pulley 244, the latter being carried at the extremity of a hollow guide tube 246. If desired, the guide tube 246 may be pivotally mounted on the adjacent side wall 10 by an appropriate set screw 248 (FIGURE 3) whereby the tube may be rotated about its longitudinal axis, thus bringing the pulley 244 into appropriate alignment with the line 242 as it is removed from a given tow reel 240. The line 242 is then strung through guide tube 246 (FIGURE 4) and around tension sensing pulley 250, from whence it is carried to outer groove association with idler pulley 252 and from there to outer groove association with counter pulley 254, accommodating directional change of the wire. From its groove engagement with the counter pulley 256, the wire is then strung in successive loops around the grooves of capstan 192 and capstan idler 190. It will be noted that the capstan 192 and the capstan idler 190 are provided with a plurality of parallel grooves therein to accommodate multiple windings of the related cable. The number of grooves in the capstan and capstan idler may be varied depending upon the amount of tension it is desired to put in the line as will hereafter be more fully described. After departure from the lower capstan pulley 190, the line is then strung to the lower manual winder pulley 256 and from thence to the upper winder pulley 258. From the upper winder pulley 258, it is of course end connected to the storage drum 44.

When it is desired to accomplish the reverse operation, that is, to take wire from an appropriate storage reel 44 and wind same onto the tow target reel 240, it will be understood that the upper winder pulley 258 is not utilized. In this operation, the cable is removed from drum 44 and initially brought into operative association with the lower winder pulley 256, as is indicated in phantom at 260. Thereafter, the wire is sequentially strung through the reels and pulleys, as heretofore indicated.

Figure 5:
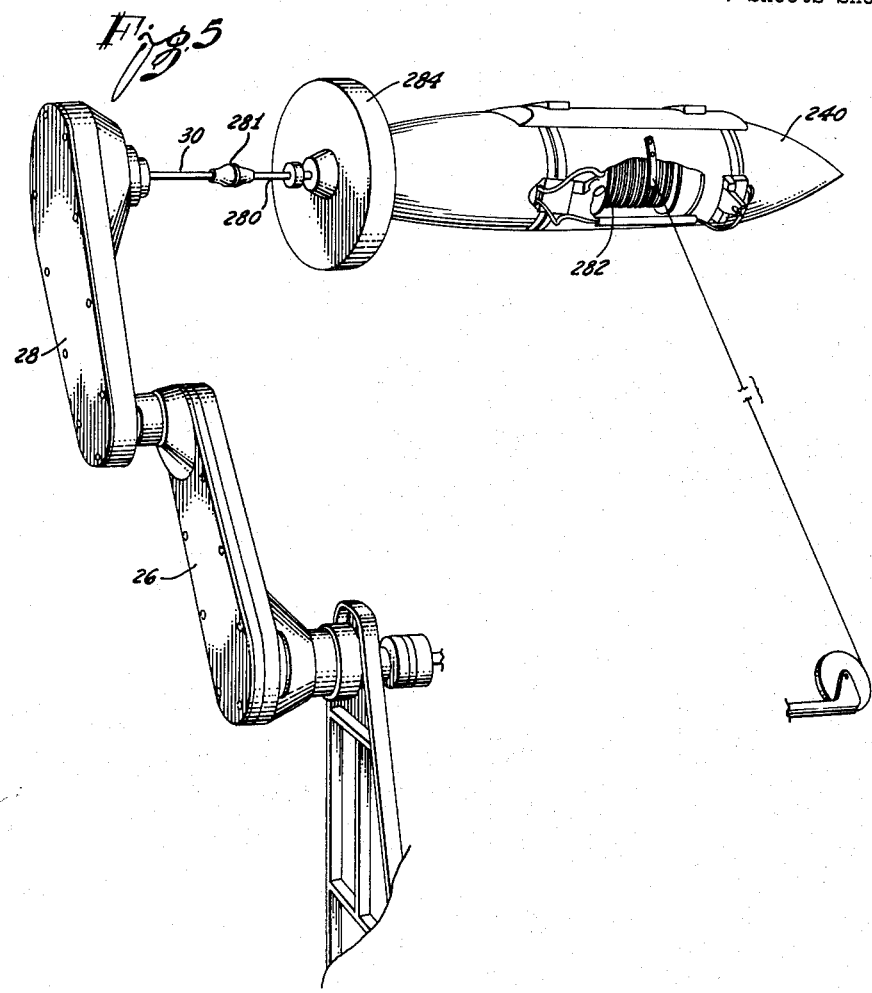
FIGURE 5 is a fragmentary perspective view showing the equipment of FIGURE 1 in position to install line on an appropriate tow reel which may be aircraft mounted.

Attention is now directed to FIGURE 5 which fragmentarily illustrates the herein described equipment in operative relation with tow reel 240 to accomplish assembly of the cable to the tow reel. As above noted, the reel 240 may be mounted to an aircraft (not shown). Returning to FIGURE 1, it will be recalled that the coupling 32 is disconnectable. Accordingly, to accomplish this operation, the coupling 32 is disconnected and removed from shaft 30. Arms 26 and 28 are brought to the extended position (FIGURE 5) whereby the output shaft 30 is in alignment with the shaft 280 which, in turn, is operatively associated with the rotatable tow reel 282. A breakable conventional coupling 281 completes the connection. Recalling that tow reel devices such as 240 are turbine actuated by virtue of motion through the air and consequent air flow therethrough, it will be understood that it is desirable to cloak the nose portion of the device with an appropriate shroud or the like to insulate the turbine from communication with the atmosphere and thereby prevent air flow therethrough during the loading of the reel 282.

The initial operation of the equipment will be described relative to the removal of appropriate line from the aircraft mounted tow reel device 240. For this purpose, it will be understood that the equipment is arranged as shown in FIGURE 1 with the output shaft 30 connected via coupling 32 through the gear box 36 and to the drum 44. The tow reel device 240 is provided with a shroud 284 which acts to inhibit air flow through the reel device and appropriately load the reel for wire removal. Initially, the machine may be started by energizing of motor 16 whereby power is transmitted as above described to the drum 44, the latter being arranged to rotate to accomplish wire or cable takeup. If desired, the variable speed drive 18 may be manually controlled by the operator to initially start the equipment in a conventional manner at a relatively slow speed and then, as unwinding proceeds, to gradually increase the speed of rotation of the drum 44 to increase the efficiency of the unwinding operation. While the unwinding operation is being accomplished, the operator desirably smoothly moves the arm 96 reversably over the surface of the drum 44 to provide a level disposition of cable thereon. As the operator approaches the point of complete wire removal from the tow reel 240, it is desirable, from the standpoint of smooth operation and personal safety, to gradually slow the rotative motion of the drum 44 down and stop same just before the wire is completely removed from the tow reel 240. The last few feet of wire removal may be accomplished manually or with the drum rotating at a very slow speed, thereby providing the required safe operation of the equipment.

Figure 9:
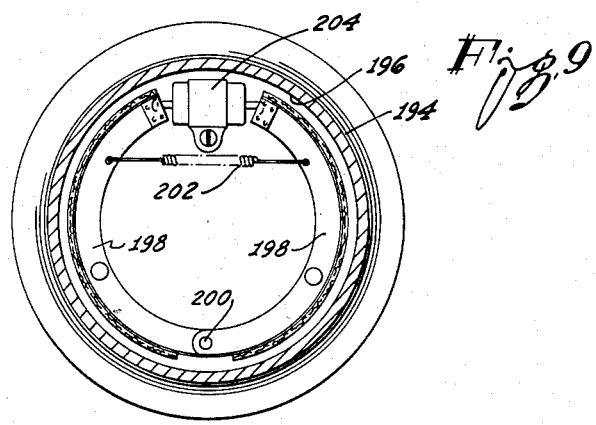
FIGURE 9 is a fragmentary sectional view taken along line 9—9 of FIGURE 8.

Alternately, when it is desired to load a tow reel 240, the wire is initially strung in the alternate manner as described relative to FIGURE 4 above and has its free end initially connected to the drum 282 of the tow reel 240. Coupling 32 is then dismantled and output shaft 30 is connected via universal coupling 231 to the rotatable shaft mounting the tow reel 282. To prevent overspeed of the drum 44, which is now in a free wheeling condition, the handle 90 of the drum brake arrangement is rotated until the brake disc 40 is brakingly loaded. This restrains rotative motion of the drum 44. Thereafter, the motor 16 is energized and rotation of the tow reel drum 282 is begun at a relatively low speed. As the speed of rotation of the drum 282 is increased, handle 232 which, as above described, is operatively connected to the braking mechanism shown in FIGURES 8 and 9, is rotated thus expanding the brake shoes 198 and bringing them into frictional contact with the brake drum 194. In this manner, wire induced rotation of the capstan 192 is frictionally dragged, thereby placing an appropriate tension on the cable going therefrom and to the drum 282 of the tow reel 240. It will be understood that the resistive torque of the brake shoes 198 is transmitted to shaft 186 and then to the wire via capstan 182. This structure results in a substantial mechanical advantage due to the diameter of the capstan 192 and the number of effective turns of the wire therearound. It is desirable to maintain this tension at an appropriate level to insure compact winding of the tow reel cable into the reel 240 without overstressing same. Further, the braking drag placed on the disc 40 operatively associated with the drum 44, should be at a level which complements the tensioning effect placed on the capstan 192. That is, the braking effect on the disc 40 should be such as to just approximate or slightly overbalance the tension placed on the capstan 192. In this manner, overspeed of the drum 44 and proper winding and installation of the cable onto the reel 240 will be accomplished.

The disclosed embodiment of the invention is by way of illustration and not limitation and reasonably may be modified without departing from the scope of the appended claims.

I claim:
1. In a cable winding machine,
a power source,
an output associated with said power source,
a plurality of relatively movable power transmitting arms one of which is movably connected to said machine,
said arms comprising a plurality of operatively interconnected gear elements for power transmission therethrough,
an output shaft carried on one of said arms and operatively connected to the elements,
said interconnected gear elements being arranged to transfer power from said first mentioned output shaft to said second mentioned output shaft,
a storage reel,
an installed cable reel,
pulley means arranged to guidably direct cable from the storage reel to the installed cable reel,
and demountable coupling means arranged to selectably connect said second mentioned output shaft to one of said reels.
2. A cable winding machine according to claim 1,
and including cable tensioning means comprising a rotatable shaft having a capstan device mounted thereon for rotation therewith,
a brake drum mounted on the shaft for rotation therewith,
friction means operatively associated with the drum,
and means to variably engage said friction means with said drum to inhibit rotation of said capstan device,
said cable being in intimate rollable engagement with said capstan device.
3. In a cable winding machine,
a frame,
a storage reel cradled in the frame for demountable association therewith,
a rotatable installed cable reel,
a plurality of pulley means to guidably direct cable between the reels,
a capstan device having the cable rollably and intimately wrapped therearound,
brake means operatively connected to the capstan device and arranged to frictionally inhibit rotation of the capstan device in a variable controllable manner,
a power source,
and power transmission means having an input end operatively associated with said power source,
said power transmission means having an output end selectably connectable to one of said reels,
said power transmission means comprising a first link pivotally movable relative to the frame,
a second link connected to the first link and pivotally movable relative to the frame and to said first link,
said links containing a plurality of operatively interconnected gears and flexible drive elements mounted in the links for independent movement therein to accomplish power transmission from said source to said output end whereby said power source is operative to drive said one reel and transfer cable between the reels.
4. A cable winding machine according to claim 3,
and including shroud means operatively associated with said installed cable reel.
5. In a cable winding arrangement,
a rotatable storage reel and a rotatable installed cable reel,
a plurality of pulley means pivotally mounted on the arrangement and operative to guidably direct the cable between the reels,
said pulley means including a capstan device comprising a capstan wheel and a capstan idler,
a plurality of guiding notches on the capstan wheel and capstan idler accommodating a plurality of cable loops therearound,
brake means operatively associated with the capstan wheel and arranged to variably inhibit rotation thereof,
second brake means operatively associated with the storage reel and arranged to variably inhibit rotation of the storage reel;
a power source;
power transmission means having one end permanently associated with the source and having a power output end adapted for variable and selectable connection to either of said reels, said power transmission means including a first housing arm and a second housing arm,
said first housing arm having a pivotal connection to the arrangement,
a pivotal connection operatively connecting said first housing arm and said second housing arm,
and means within the housing arms to accommodate power transmission therethrough,
said last named means comprising a plurality of interconnected movable drive elements each being movable independently of the relative motion of the housing arms.

References Cited in the file of this patent

UNITED STATES PATENTS

| | | |
|---|---|---|
| 358,354 | Hayes | Feb. 22, 1887 |
| 710,846 | Dallas | Oct. 7, 1902 |
| 970,884 | Carter | Sept. 20, 1910 |
| 1,876,390 | Boernsen | Sept. 6, 1932 |
| 1,978,974 | Williams | Oct. 30, 1934 |
| 2,555,643 | Harrison | June 5, 1951 |
| 2,819,350 | Steinegger | Jan. 7, 1958 |
| 2,868,467 | Lewis | Jan. 13, 1959 |
| 2,896,873 | Mageoch | July 28, 1959 |
| 2,913,191 | Nelson | Nov. 17, 1959 |
| 2,948,483 | Petersen | Aug. 9, 1960 |

FOREIGN PATENTS

| | | |
|---|---|---|
| 690,100 | Great Britain | Apr. 15, 1953 |